United States Patent [19]

Chu et al.

[11] Patent Number: 5,465,143
[45] Date of Patent: Nov. 7, 1995

[54] ADP SWITCH AND ADJUSTABLE DATA ACQUISITION WINDOW

[75] Inventors: Ching Chu, Oakville; David Liao, Burlington; Kai D. Feng, North York, all of Canada

[73] Assignee: Antel Optronics Inc., Burlington, Canada

[21] Appl. No.: 186,966

[22] Filed: Jan. 27, 1994

[51] Int. Cl.[6] ................................................. G01N 21/88
[52] U.S. Cl. ............................................................ 356/73.1
[58] Field of Search ............................................. 356/73.1

[56] References Cited

U.S. PATENT DOCUMENTS

| | | | |
|---|---|---|---|
| 4,421,979 | 12/1983 | Asawa et al. | 73/800 |
| 4,459,477 | 7/1984 | Asawa et al. | |
| 4,463,254 | 7/1984 | Asawa et al. | 250/231 R |
| 4,477,725 | 10/1984 | Asawa et al. | 250/231 R |
| 4,685,799 | 8/1987 | Brininstool | 356/73.1 |
| 4,794,249 | 12/1988 | Beckmann et al. | 356/73.1 X |
| 4,804,264 | 2/1989 | Kirchhofer et al. | 356/44 |
| 4,812,038 | 3/1989 | Nazarathy et al. | 356/73.1 |
| 4,838,689 | 6/1989 | Neumann | 356/73.1 |
| 4,838,690 | 6/1989 | Buckland et al. | 356/73.1 |
| 4,875,772 | 10/1989 | Gentile | 356/73.1 |
| 4,928,232 | 5/1990 | Gentile | 364/525 |
| 4,952,057 | 8/1990 | Kamikawa et al. | 356/75.1 |
| 4,960,989 | 10/1990 | Liebenrood et al. | 356/73.1 X |
| 5,020,872 | 6/1991 | DuPuy et al. | 455/611 X |
| 5,023,445 | 6/1991 | Goll et al. | 356/73.1 X |
| 5,033,826 | 7/1991 | Kolner . | |
| 5,062,704 | 11/1991 | Bateman | 356/73.1 |
| 5,067,810 | 11/1991 | Bu-Abbud | 356/73.1 |
| 5,069,544 | 12/1991 | Buerli | 356/73.1 |
| 5,072,111 | 12/1991 | Gilino | 356/73.1 X |
| 5,082,368 | 1/1992 | Fuchs et al. | 356/73.1 |
| 5,093,568 | 3/1992 | Maycock | 250/227.14 |
| 5,113,277 | 5/1992 | Ozawa et al. | 359/127 |
| 5,123,732 | 6/1992 | Gross et al. | 356/73.1 |
| 5,129,722 | 7/1992 | Mader et al. | 356/73.1 |
| 5,137,351 | 8/1992 | So | 356/73.1 |
| 5,142,284 | 8/1992 | Trent et al. | 341/122 |
| 5,179,420 | 1/1993 | So et al. | 356/73.1 |
| 5,185,874 | 2/1993 | Trent et al. | 395/400 |

FOREIGN PATENT DOCUMENTS 9302344 7/1992 WIPO .

*Primary Examiner*—Vincent P. McGraw
*Attorney, Agent, or Firm*—Davis Hoxie Faithfull & Hapgood

[57] ABSTRACT

An OTDR to examine light reflected from an optic fibre has an amplification stage that operates in either a high gain or low gain mode. To avoid saturation of the amplifier in the high gain mode, the trace is examined to identify the location of spikes and a switch is controlled to connect the amplifier to the signal after the occurrence of the spike.

11 Claims, 4 Drawing Sheets

ADP SWITCH AND ADJUSTABLE DATA ACQUISITION WINDOW

The present invention relates to optical time domain reflectometers (OTDR), in particular to an apparatus and method for controlling the processing of the signal received by the OTDR.

An OTDR is used to interrogate an optic fibre and locate any faults within the fibre. An OTDR typically uses a coherent light source and transfers an optical pulse to the fibre. As the pulse is transmitted along the fibre, a portion of the signal is reflected or backscattered and the reflected signal may be detected and monitored to provide an indication of discontinuities or faults within the fibre. As the pulse moves along the fibre it is attenuated and a portion is reflected. Accordingly the signal received by the OTDR progressively decreases and it is not unusual for the input signal to vary by 35 db.

At lower signal levels, therefore, it is necessary to amplify the received signal for further processing but amplifiers that exhibit sufficient gain to provide usable signals at lower signal levels are saturated by the high signal strengths initially received. Similarly, a discontinuity or fault within the fibre may cause the pulse to be reflected by the discontinuity rather than attenuated and a high transient signal may be received which will saturate the amplifier. Saturation of the amplifier will result in distortion at the output during the application of the high signal strength and will generally be followed by a large thermal recovery waveform. As such, the accuracy of the signal processing is affected for a significant period.

One prior proposal for addressing this problem is to use a non-linear feedback to the amplifier. Whilst this protects the amplifier against the peak transients it makes signal processing and analysis more difficult.

An alternative approach is shown in U.S. Pat. No. 5,023,445 to Goll. Goll uses an optical modulator to mask the high dynamic range optical receiver when large reflected signals are received from an unmasked received signal. A masking pattern is generated that attenuates the reflected signal for certain time intervals or windows that correspond to the occurrence of the large reflected signals. However, the optical modulators are relatively expensive and do not completely prevent the transmission of the reflected signal when operated. Accordingly, it is necessary to conduct an additional test with the receiver masked continuously and then combine the results to obtain an accurate trace. This technique also requires the accurate determination of the windows in the masking pattern by generation of masking addresses.

It is therefore an object of the present invention to provide an OTDR in which the above problems are obviated or mitigated.

In general terms, the present invention provides a switch between an optical receiver and the input to an amplifier used to process the received signal. The switch is normally closed but is opened when it is predicted that a high amplitude signal is to be received. This prediction is based upon signals received in a previous test which identifies the location or time intervals from launch of the light pulse at which the high amplitude peaks occur. The signal is thus disconnected from the amplifier to avoid saturation and is connected when the high amplitude signal is no longer present.

More specifically, the present invention provides an OTDR comprising a light source to transmit an optical pulse to and along an optical fibre to be tested, an optical receiver to detect an optical signal produced by reflection of said pulse as it passes along said fibre and to produce an electrical signal corresponding thereto, an amplifier having an input to receive said electrical signal and an output to direct said signal to a signal processor to obtain an indication of the variation of said signal as said pulse passes along said fibre, an input switch to regulate the passage of said signal from said receiver to said input and having a first condition in which said receiver is disconnected from said amplifier and a second condition in which said receiver is connected to said amplifier, monitoring means to monitor said received signal and identify periods during which said electrical signal exceeds said predetermined value, selection means to select one of said periods and control means to maintain said switch in said first condition prior to said selected one of said periods and in said second condition thereafter.

It is preferred that the amplifier has both a high gain and a low gain mode of operation and switching between the two modes is performed under the control of a gain switch which monitors the signal level and causes the amplifier to operate in the high mode once the received signal is below a pre-set level. Again it is preferred that the switch point is predicted from an earlier launch and is based upon the elapsed time from the launch of the light pulse.

It is also preferred that a dummy load is connected between the receiver and the input switch and that a load switch is provided to control connection of the dummy load to the receiver. The input switch and load switch are operated in a complementary manner so that one switch is closed when the other is open. In this way operation of the input switch to disconnect the receiver and amplification circuit causes the load switch to connect the dummy load to the receiver.

An embodiment of the invention will now be described by way of example only with reference to the accompanying drawing, in which FIG. 1 is an electrical schematic representation of the OTDR circuit;

Figure 1:
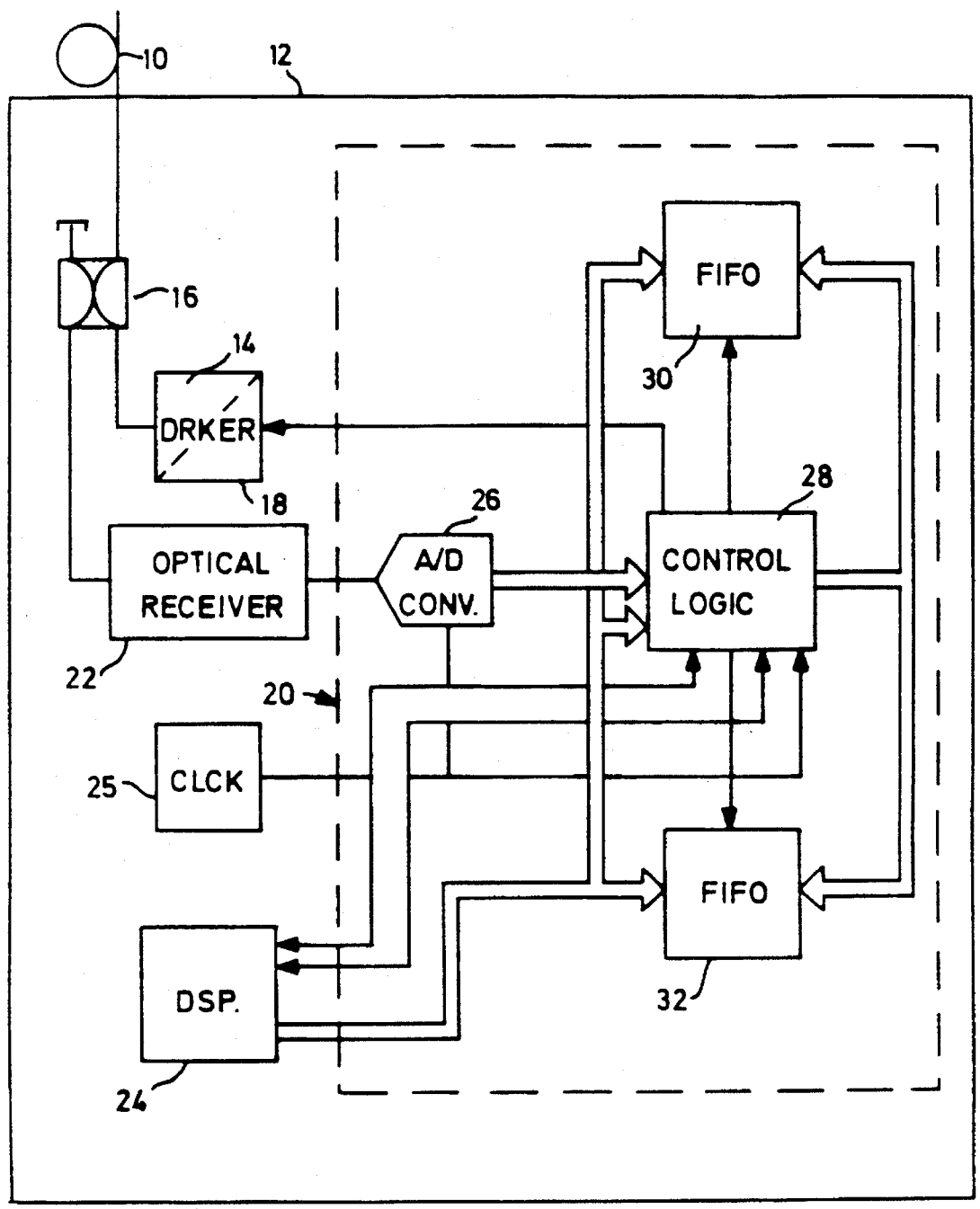

Referring therefore to FIG. 1, an OTDR generally indicated at 10 is used to interrogate an optic fibre 12. The OTDR 10 includes a laser and associated driver 14 which is controlled by a digital signal processor (DSP) 16 to transmit a light pulse to the fibre 12. As the pulse travels along the fibre 12, a portion of it is reflected and is directed to an optical receiver 18. The receiver 18 is an avalanche photo diode (APD) that produces a current proportional to the intensity of the received light. The receiver 18 therefore regulates the current flowing from a source 20 through resistor 22 to an amplification circuit 24.

The amplification circuit 24 includes a transimpedance preamplifier 26 to convert the varying current signal at its input 28 to a corresponding varying voltage signal at its output 30. A differential amplifier 29 receives the output 30 and its output 31 is connected through a gain switch 32 to a main amplification section 34 which supplies the signal to an analog to digital converter (ADC) 36. The ADC 36 samples the signal and stores the samples in a memory 38. The details of the interaction of the ADC and memory are disclosed in corresponding application filed on Dec. 14, 1993 and need not be described further.

Figure 2:
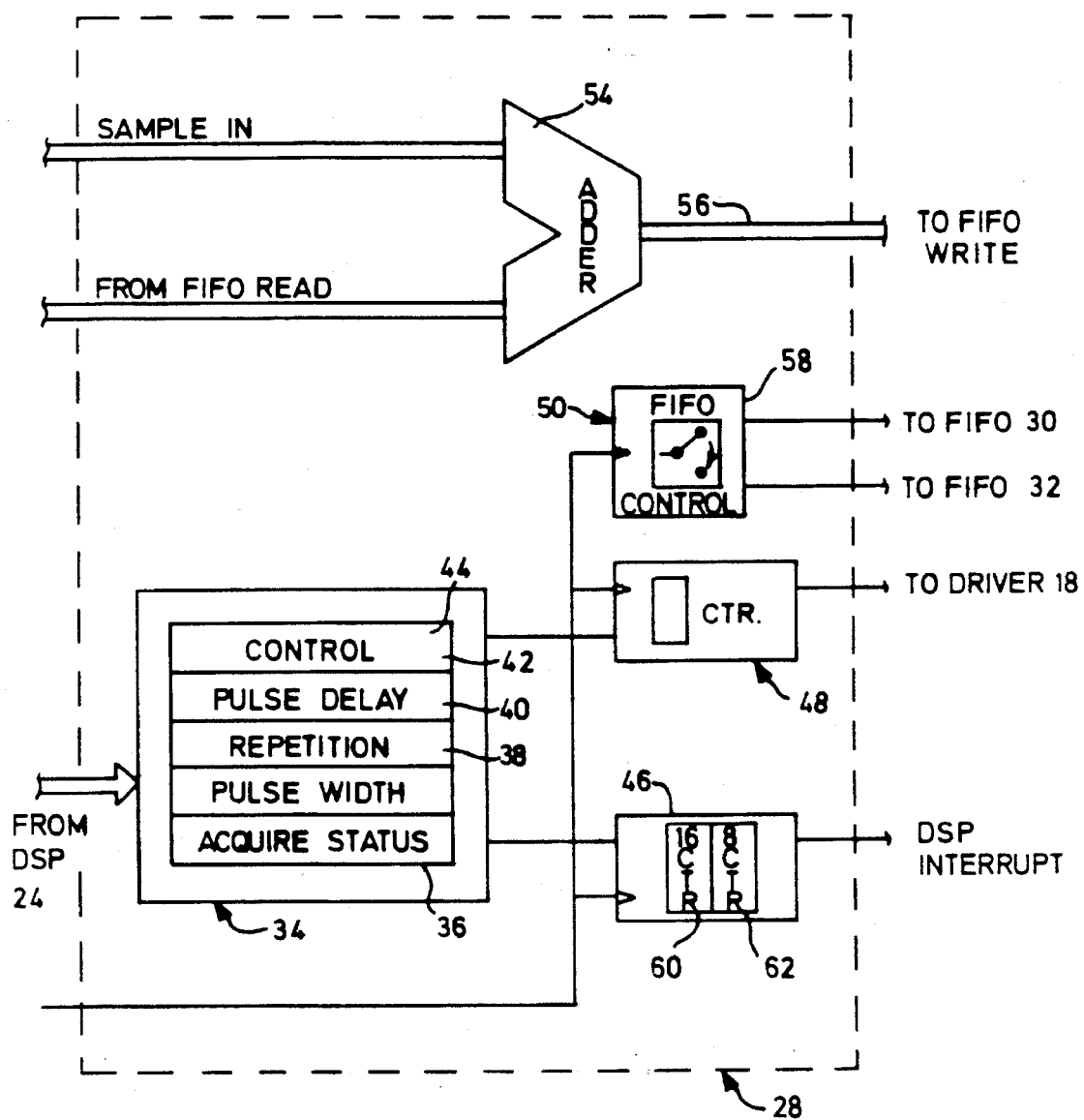
FIG. 2 is a representation of a typical signal trace.

The samples from each launch of the laser are stored in a predetermined sequence in the memory 38 and combined with corresponding values from previous launches to provide a cumulative sample value indicative of the average signal at each sample period. As each location in the memory is correlated to a location on the fibre, the stored cumulative values indicate the variation of signal strength along the fibre to provide a trace of amplitude against time as indicated in FIG. 2. The contents of the memory 38 may be transferred to a buffer 39 under the control of the DSP 16 for analysis and manipulation as required.

To provide adequate signal strength over the duration of each launch, the gain switch 32 connects the preamp 26 to the main amplifier 34 either directly through branch 40 to provide a high gain mode of operation or through an attenuating branch 42 that attenuates the signal to provide a low gain mode of operation. The operation of the gain switch 32 is controlled through a counter 44 that is incremented by a clock 46 and DSP 16. Counter 44 will operate the gain switch 32 to provide a high gain mode of operation after an interval determined by the counter 44.

The signal delivered to the input 28 of preamp 26 is controlled through an input switch 48 connected between the receiver 18 and the input 28. A complementary load switch 50 is also connected to the output of the receiver 18 and controls current flow to a load resistor 52 and diode 54 that are selected to match the electrical load characteristics of the preamp 26.

The input switch 48 and load switch 50 are controlled in a complementary manner by a counter 56. Input switch 48 is normally closed to permit current flow from the receiver 18 to the input 28. The load switch 50 is normally open to inhibit current flow through the diode 54. The switches 48,50 are maintained in their respective closed and open conditions by a control signal supplied from the counter 44 through control line 58. The control signal to the input switch 48 is inverted, as indicated at 60 relative to load switch 50 to provide the complementary operation of the switches 48,50. DSP 16 includes a set of registers 62 to store information obtained from interrogation of the buffer 39 and, under the control of DSP 16, load counters 44,56 with the contents of selected ones of the registers.

Power supplied to the preamp 26 and differential amp 29 from power supply 20 connected through a field effect transistor 64. The output of the FET 64 is applied to a zenodiode 68 and a capacitor 66 connected in parallel which together provide a fast recovery power supply for the transimpendence amplifier 26. The combination of the zenodiode 68 and capacitor 66 replaces a larger capacitor that would not provide the required response time.

The operation of the OTDR 10 will now be described assuming that the OTDR is connected to a fibre to be interrogated and that the normal test parameters such as fibre length, pulse width and number of launches per test, have been selected. The OTDR is first operated to provide a trace as indicated in FIG. 2. To obtain this trace, the gain switch 32 is conditioned to a low gain mode and the switch 48 closed, causing the switch 50 to open. Multiple launches of the laser thus provide multiple samples at low gain which are accumulated in the memory 38. After a predetermined number of launches, typically 128, the contents of the memory 38 are transferred to the ram 39 for further analysis.

The typical trace as indicated in FIG. 2 is generally of a decaying exponential form and the variation in signal strength may be as much as 35 db. The amplitude of the received signal is limited to a value, SV, at which the amplifiers 24 would be saturated and accordingly the resolution available from the ADC does not permit an accurate measurement or discrimination between samples at the lower values of the signal received. However, operation of the OTDR in a high gain mode may result in saturation of the amplifier 34 and distortion of the resulting signal. Accordingly, the DSP 16 initiates an interrogation of the values stored in the ram 39 to determine a location (equivalent to elapsed time) at which the amplifier 34 may be operated in high gain without saturation. Assuming a normal fault-free fibre, the intersect of the curve with the high gain saturation value (HGSV) provides a corresponding time $(T_a)$ at which the high gain switch 32 may be closed to connect the branch 40 to the input of the amplifier 34. If, however, as indicated in chain dot line, a discontinuity exists in the fibre, a spike, indicated at A, may result whose value exceeds the high gain saturation value. In this circumstance, the evaluation of the buffer 39 will locate the subsequent time at which the signal exceeds the HGSV and the interval from launch to occurrence, $T_a$, is noted. The elapsed time from launch to $T_a$ or TA as the case may be is stored in the register 62 for subsequent loading in the counter 44 to control the closing of the high gain switch 32 at the predetermined period after the initiation of the tests by the DSP 16. It will also be noted from FIG. 2 that a further discontinuity is indicated by a second spike B at $T_b$, but its value does not exceed the HGSV. Accordingly, $T_b$ is not noted at this time.

Figure 3:
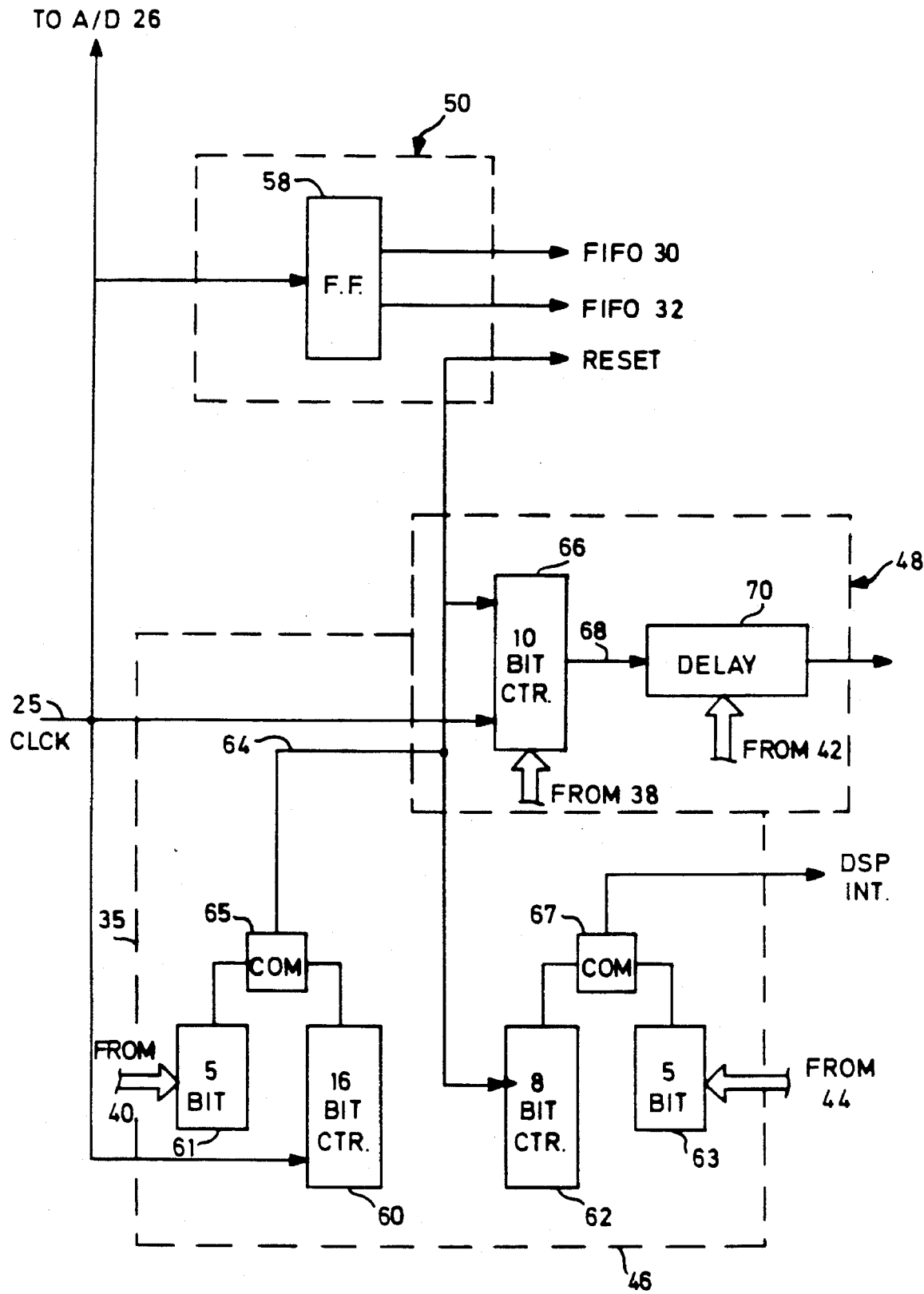
FIG. 3 is a portion of the trace shown in FIG. 2 but at an enlarged scale.
Figure 4:
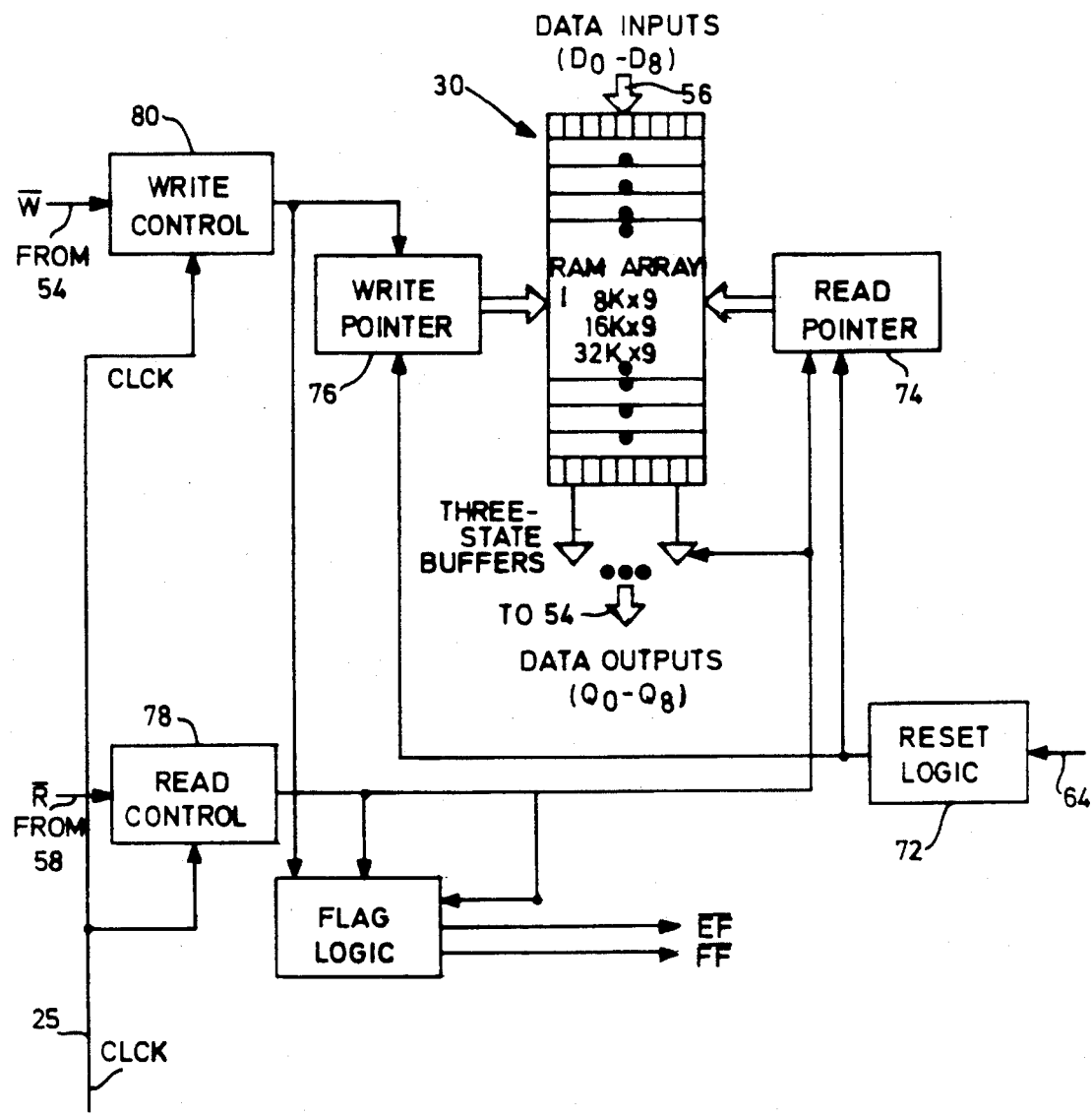
FIG. 4 is a flow chart illustrating a control procedure of the OTDR shown in FIG. 1.

The contents of the ram 39 are then interrogated in reverse order, i.e. starting at the signal corresponding to the remote end of the fibre as indicated by $T_{max}$ on FIG. 2. The values are interrogated to identify a first location where the amplitude exceeds a value $10^{-3}$ of the saturation value. This value is indicated on FIG. 3 as $S_f$ which shows the spike at $T_b$ on a larger scale. A corresponding value will also be identified for spike A.

The signal values are also interrogated to locate a value greater than or equal to the saturation value$\times 10^{-2}$. This value is indicated at $S_l$. The relative timing of $S_f$ and $S_l$ are compared and if they are located within one pulse width of the laser pulse transmitted along the fibre, it is concluded that a transient value in the form of a spike is present on the signal and the corresponding values of $S_f$ are noted and stored in the registers 62.

The interrogation then continues using the value of $S_l$ as $T_{max}$ and the next spike located. This continues until all spikes have been located and a full set of values stored in registers 62.

The OTDR is then operated to interrogate the fibre starting at T=0 and proceeding through $T_{max}$. For each launch of the first test, the value of $T_a$ is loaded value of $S_f$ at spike A is loaded into the counter 44 and the counter 56. The switch 48 is open so that the output from the photodiode is connected to the dummy load and input is not transmitted to the amplifier 26. Upon the counter 56 attaining the value $S_f$, a signal is transmitted through line 58 to close the switch 48 and open the switch 50. AT the same time, counter 44 closes the gain switch 32 to connect the output of the diode 18 to the amplification section and ADC 36. This procedure is repeated for the requisite number of launches and the cumulative values obtained are stored in the memory 38 and subsequently transferred to the ram 39. The values from $S_f$ of spike A to the time $S_f$ associated with spike B are stored by the DSP for future use and the balance discarded as they are suspect.

The DSP then conducts a further set of tests to interrogate the signal from spike B to the end of the fibre. The value of $S_{f2}$ of spike B is loaded in the counter 56 so that switch 48 remains open until position $S_f$ is attained whereupon it is closed to connect the photodiode to the amplifier 34 in a high gain mode. Again, after the requisite number of tests, the cumulative signal values are transferred to the ram 39 and those values between $S_f$ and the end of the fibre are stored by the DSP 16.

If a further spike had previously been identified, the values between successive values $S_f$ would be stored and each segment of the trace between the spikes evaluated in turn.

Once each segment of the trace has been sampled in high gain, the segments are compiled to give a continuous trace. However, because the signal is not transmitted to the amplification section until it is below the saturation value $\times 10^{-3}$ for the segment selected, the signal obtained does not suffer from distortion due to swamping or saturation of the amplifier and so provides an accurate indication of the nature of the discontinuity.

It will be appreciated that this technique will permit multiple discontinuities to be examined and also will permit utilization of multiple gain switches to increase the resolution at low signal strength. It is simply necessary to identify the changeover points at the different gains and control a corresponding counter to cause the switch to move to a high gain mode.

We claim:

1. An OTDR comprising a light source to transmit an optical pulse to and along an optical fibre to be tested, an optical receiver to detect an optical signal produced by reflection of said pulse as it passes along said fibre and to produce an electrical signal corresponding thereto, an amplifier having an input to receive said electrical signal and an output to direct said signal to a signal processor to obtain an indication of the variation of said signal as said pulse passes along said fibre, an input switch to regulate the passage of said signal from said receiver to said input and having a first condition in which said receiver is disconnected from said amplifier and a second condition in which said receiver is connected to said amplifier, monitoring means to monitor said received signal and identify periods during which said electrical signal exceeds a predetermined value, selection means to select one of said periods and control means to maintain said switch in said first condition prior to said selected one of said periods and in said second condition thereafter.

2. An OTDR according to claim 1 wherein said selection means selects different ones of said periods in successive tests of said fibre.

3. An OTDR according to claim 2 wherein said signal processor includes a memory to retain said electrical signal processed by said signal processor, said selection means being operable upon said memory to store the portion of said processed electrical signal occurring between said one selected period and the next of said periods.

4. An OTDR according to claim 1 wherein said signal processing means includes a sampling means to sample periodically the output of said amplifier and a memory to store samples provide by said sampling means.

5. An OTDR according to claim 4 wherein said signal processor accumulates samples from successive launches of said light source to provide an indication of the variation of said signal as said signal passes along said fibre.

6. An OTDR according to claim 5 wherein said periods are identified from evaluation of said accumulated samples.

7. An OTDR according to claim 6 wherein said periods are identified by locating a first set of accumulated samples having a value greater than a first predetermined value.

8. An OTDR according to claim 7 wherein said periods are further identified by locating a second set of accumulated samples having a value greater than a second predetermined value and determining whether samples of said second set occur within a specified interval of a corresponding sample of said first set.

9. An OTDR according to claim 1 wherein said amplifier is operable in either a high gain mode or a low gain mode and a gain switch is provided to change from a low gain mode to a high gain mode upon said electrical signal attaining a value below a preset value.

10. An OTDR according to claim 9 wherein a dummy load is connected between said receiver and said input switch and a load switch is provided to control connection of said dummy load to said receiver, said input switch and said load switch being operated in complementary manner whereby operation of said input switch to said first condition causes said load switch to connect said dummy load and receiver.

11. An OTDR according to claim 9 wherein said monitoring means determines the interval between operation of said light source and attainment of said preset value and operates said gain switch to said high gain mode upon expiry of said interval.

* * * * *